United States Patent [19]

Cripps

[11] Patent Number: 4,471,167
[45] Date of Patent: Sep. 11, 1984

[54] WIRELESS EXTENSION TELEPHONE

[75] Inventor: Peter K. Cripps, Cranbury, N.J.

[73] Assignee: GTE Automatic Electric Inc., Northlake, Ill.

[21] Appl. No.: 450,410

[22] Filed: Dec. 16, 1982

[51] Int. Cl.³ ............................................. H04Q 7/04
[52] U.S. Cl. ................................. 179/2 EA; 179/2 E; 455/84
[58] Field of Search ................. 179/2 E, 2 EA, 2 EB, 179/2 EC; 455/79, 84, 85, 35-38, 31

[56] References Cited

U.S. PATENT DOCUMENTS 4,039,760 8/1977 Gregory et al. ................. 179/2 EA
4,213,009 7/1980 Suzuki ............................ 179/2 EA Primary Examiner—G. Z. Rubinson
Assistant Examiner—W. J. Brady
Attorney, Agent, or Firm—Robert J. Black; Peter Xiarhos

[57] ABSTRACT

A wireless extension telephone system including a base unit connected to a telephone line and a remote extension unit. Both base and remote units each include a radio transmitter and a radio receiver. Also included in the base unit is bimodal tuned circuit operable as a filter and as an oscillator.

6 Claims, 3 Drawing Figures

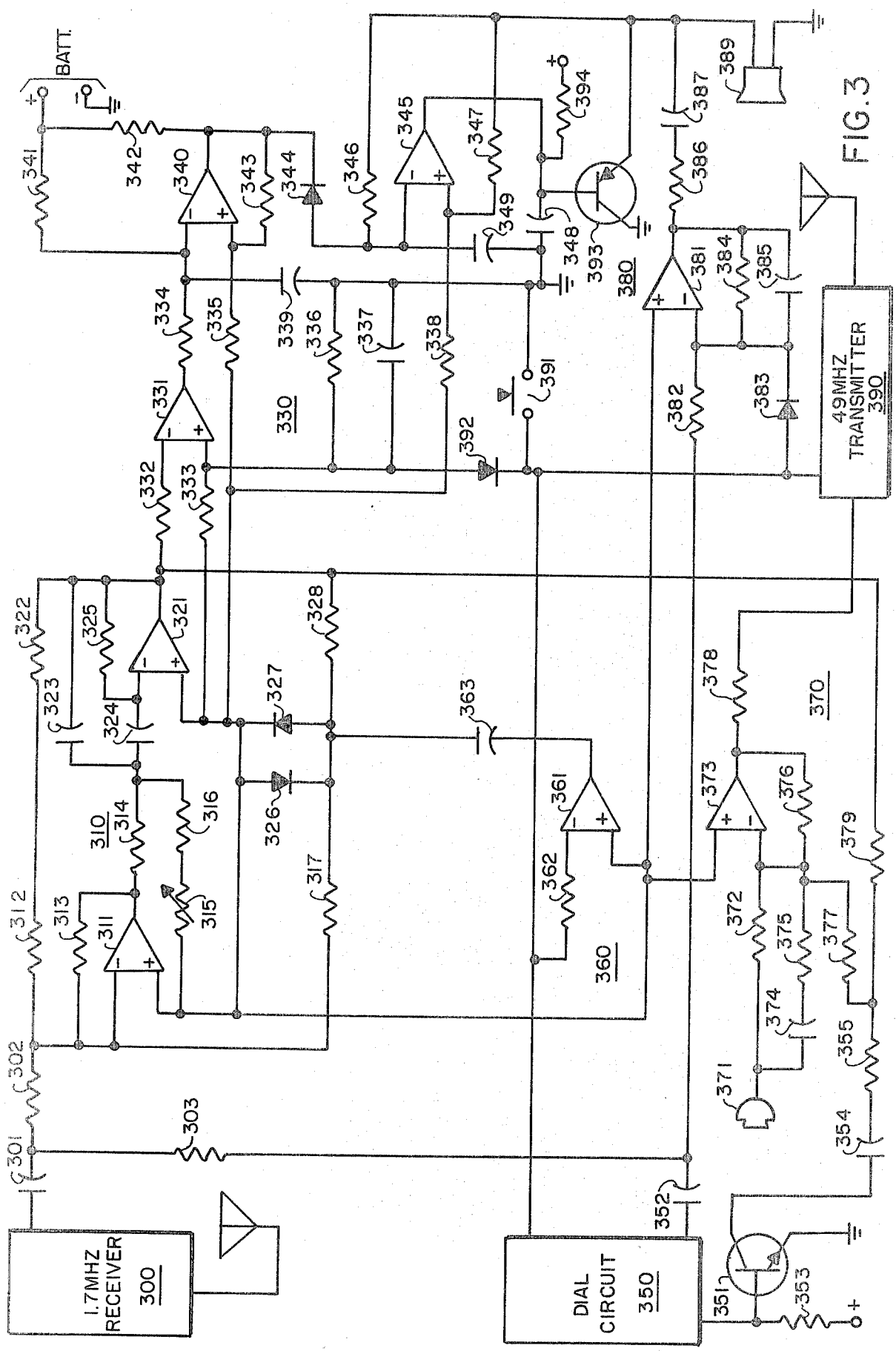

WIRELESS EXTENSION TELEPHONE

U.S. patent application, Ser. Nos. 450,405; 450,406; 450,407; 450,408 and 450,420, filed on the same date as the present application and Ser. No. 450,497 filed on Mar. 23, 1983, are related to the present application.

BACKGROUND OF THE INVENTION

1. Technical Field

The present invention relates to telephone systems and more particularly to a subscriber's extension telephone that includes a wireless link between the telephone instrument and an associated telephone line, allowing a subscriber to relocate the telephone instrument at will, yet still make and receive telephone calls in a conventional manner.

2. Background Art

Since the invention of the telephone, personal communication between individuals has grown so that the majority of all individuals in the United States and many other countries all have telephone service readily available. Rather than reach a saturation point when each family has been equipped with a single telephone, the growth trend has continued so that at present many individuals or families have not one, but several telephones for use in their residences.

The use of second and third telephones as extension units throughout a residence has become increasingly widespread. Previously, when only one telephone was installed in a home a central location for this instrument was chosen. However, no single location is perfect; and as a result frequently the housewife while performing daily chores is forced to come some distance, particularly in a large home, to the location of the telephone either to make or receive telephone calls. If the subscriber is in the yard, porch or basement, etc., the lack of proximity to a telephone instrument often results in extra steps and possibly missing a telephone call if the subscriber is unable to respond within a reasonably short period of time after the commencement of a ringing signal announcing the incoming call. In the trend toward so-called outdoor living today, the subscriber is frequently required to go from the garden or patio to the nearest telephone to answer it. In many cases this may be a substantial distance.

Several solutions to this problem have been proposed. Among these are the use of a number of extension telephones placed in convenient locations throughout the residence. The other is the use of a multiplicity of telephone line jacks, all connected to the telephone line, allowing the subscriber to move a plug equipped telephone instrument from one location to another to always be within easy access. Still another, is the use of long extension cords to connect the telephone instrument to its associated terminal thus allowing limited freedom in relocating the telephone. Obviously, all of these solutions lack flexibility since the location of the extension telephone or the extension jack while useful at times will still on many occasions be inadequate.

The most satisfactory solution to the extension telephone problem lies in the use of a telephone extension instrument that requires no wire connections between the instrument and the telephone line. An instrument such as this utilizing radio waves between terminal equipment connected to the telephone line and the instrument itself permits the subscriber to locate the telephone instrument any place within a specified range of telephone line terminal equipment located in the home or other location thus permitting the subscriber to both receive and make telephone calls at some distance from that terminal. Such a wireless extension telephone could be taken to the garden, patio, basement, upstairs, downstairs, etc., and placed in any room in the house as well as possibly carried with the subscriber while visiting a neighbor, so that incoming telephone calls would not be missed and so that they might be rapidly answered without considerable moving about on the part of the subscriber. The advantages of a wireless telephone instrument for subscribers is readily apparent, particularly in the home.

However, it should be pointed out that this same type of instrument would find considerable use in restaurants and other commercial establishments where a person to whom an incoming call is directed would have the telephone brought to him for answering without the necessity for intervening extension cords or other connections. Obviously, the number of possible uses for wireless extension telephones are limited only by the imagination of the users.

Early attempts to provide wireless extension telephones are disclosed in U.S. Pat. No. 2,129,332 to Mastini issued Sept. 6, 1938 and U.S. Pat. No. 2,894,121 to R. P. Phillips which issued on July 7, 1959. Both of these patents disclose simple wireless extension telephones employing vacuum tubes. In both instances, incoming telephone calls cause a transmitter associated with the telephone line to generate a carrier signal which is detected by a remote receiver. Likewise, calls initiated at a remote unit are effected by turning on a transmitter, with the carrier signal being detected by a receiver associated with the telephone line. The obvious disadvantage of size and large battery requirement etc. stem from the utilization of vacuum tubes, while reliance on detection of carrier wave signals for supervision, i.e.: "on" and "off" hook signal dialing, etc., is less than satisfactory because of the possible effect of RF interference caused from extraneous sources.

A substantially improved wireless extension telephone is disclosed in U.S. Pat. No. 3,193,623, issued on July 6, 1965 to R. V. Burns et al. The disclosed wireless extension telephone consisted of transistorized remote base and extension units with the obvious advantages of miniaturization as well as low battery drain. Additionally, full duplex operation is disclosed. "Off" and "on" hook supervision and dialing are accomplished by means of tone generation and detection rather than the use of RF carrier techniques taught in many of the prior art patents. In the Burns et al patent a tone of a first audio frequency superimposed on the RF carrier provides "off" and "on" hook control from the remote unit and a second audio tone generated at the remote unit provides dial pulse control. A number of other units employing different techniques such as sequential control, "touch calling" signalling, etc., have been taught in U.S. Pat. Nos. 3,721,771, 4,039,760 and 4,053,717. All of the above units, however, suffer from one or more defects in the area of reliability, size, battery consumption or security. Accordingly, it is the object of the present invention to provide a new and improved wireless extension telephone overcoming those shortcomings found in many previous wireless extension telephones.

SUMMARY OF THE INVENTION

The present invention consists of two principal portions: a base station connected to a telephone line and a remote station adapted to be located with the base station when not in use so that internal batteries contained therein may be recharged. The remote unit, however, is removable from the base unit and because of its small size extremely portable and capable of being located any place within the operating range of transmitters and receivers contained in both base and remote units.

The base unit as connected to the telephone line includes a self-compensating network similar to that found in many commercial telephones and particularly like that found in a subscriber's unit designated Solitare-®II manufactured by GTE Automatic Electric Incorporated. Also connected to the line is a ringing signal detector for determining the presence of incoming ringing signals over the telephone line.

A receiver operable at the same frequency as the transmitter in the remote unit is included in the base station as is a transmitter operating on a second frequency. This second frequency is the same as the receiver operating frequency at the remote unit. Because of the use of two separate and distinct frequencies for transmit and receive in opposite directions between base and remote units, the advantages of full duplex operation are enjoyed.

A power supply included at the base unit provides the necessary operating potentials to the circuitry included in the base unit as well as providing power for charging the batteries included in the remote unit when the remote unit is not in operation. Also included in the base station are a combination security tone oscillator and tone filter circuit utilized when the unit is in the "off" hook condition as a filter for incoming security tone signals and in the "on" hook condition as an oscillator to signal the remote unit by means of a discrete security tone to indicate that the telephone line is ringing and the call should be answered. Connected to the security tone oscillator/filter circuit is an "on" hook/"off" hook control circuit which in response to the incoming security tone conditions the telephone to go to the "off" hook condition. An associated security tone detector detects the security tone from the remote unit and prevents unauthorized remote units from seizing the telephone line.

The base unit further includes a modulator which is connected between the telephone line and a base unit transmitter for the application of audio signals to the transmitter for re-transmission to the remote unit. A gain control or oscillator keyer is provided as well as an audio amplifier that applies audio signals from the receiver included in the remote unit to the telephone line.

Of particular interest in the present unit if the facility for adding an auxiliary phone and a capability by means of the operation of a switch on the base unit whereby the auxiliary phone connected to the remote unit can then contact the remote unit on a local or intercom basis. This feature can also be utilized in connection with central office calls for three way conversations.

Much of the structure of the remote unit is similar to that found in the base unit, i.e., there is included a receiver and transmitter operating on frequencies the same as the transmitter and receiver respectively at the base unit. A combination oscillator/filter for generating and receiving security tone with the filter functioning to detect security tone during a remote unit "off" hook condition and acting as an oscillator for generating security tone when the unit is "on" hook. Connected to the oscillator/filter is the ringer/oscillator amplifier which when the security tone is detected by the receiver and passed through the security tone filter generates a tone signal applying it to the remote unit ear piece as an alternating signal. An amplifier is also connected between the ear piece and the remote unit receiver for amplification of incoming signals detected by the remote unit receiver and transmitted from the base unit. The microphone included in the remote unit is connected to a modulator which in turn applies voice signals to the transmitter for transmission to the base unit.

Also included in the remote unit is a dialing circuit which employs a commercially available pulse dialer activated from a ten button key board unit included in the remote unit. A loopstick of conventional design is employed as an antenna for the receiver at the remote unit while the transmitter is coupled to a dipole antenna included in the housing of the remote unit.

At the base unit the receiver is connected to a whip antenna while the base unit transmitter is capacitively coupled through an RF choke coil to the AC line providing power to the base unit.

BRIEF DESCRIPTION OF THE DRAWINGS

FIG. 3 is a combination schematic and block diagram of a remote unit for a wireless extension telephone in accordance with the present invention.

DESCRIPTION OF THE PREFERRED EMBODIMENT

Figure 1:
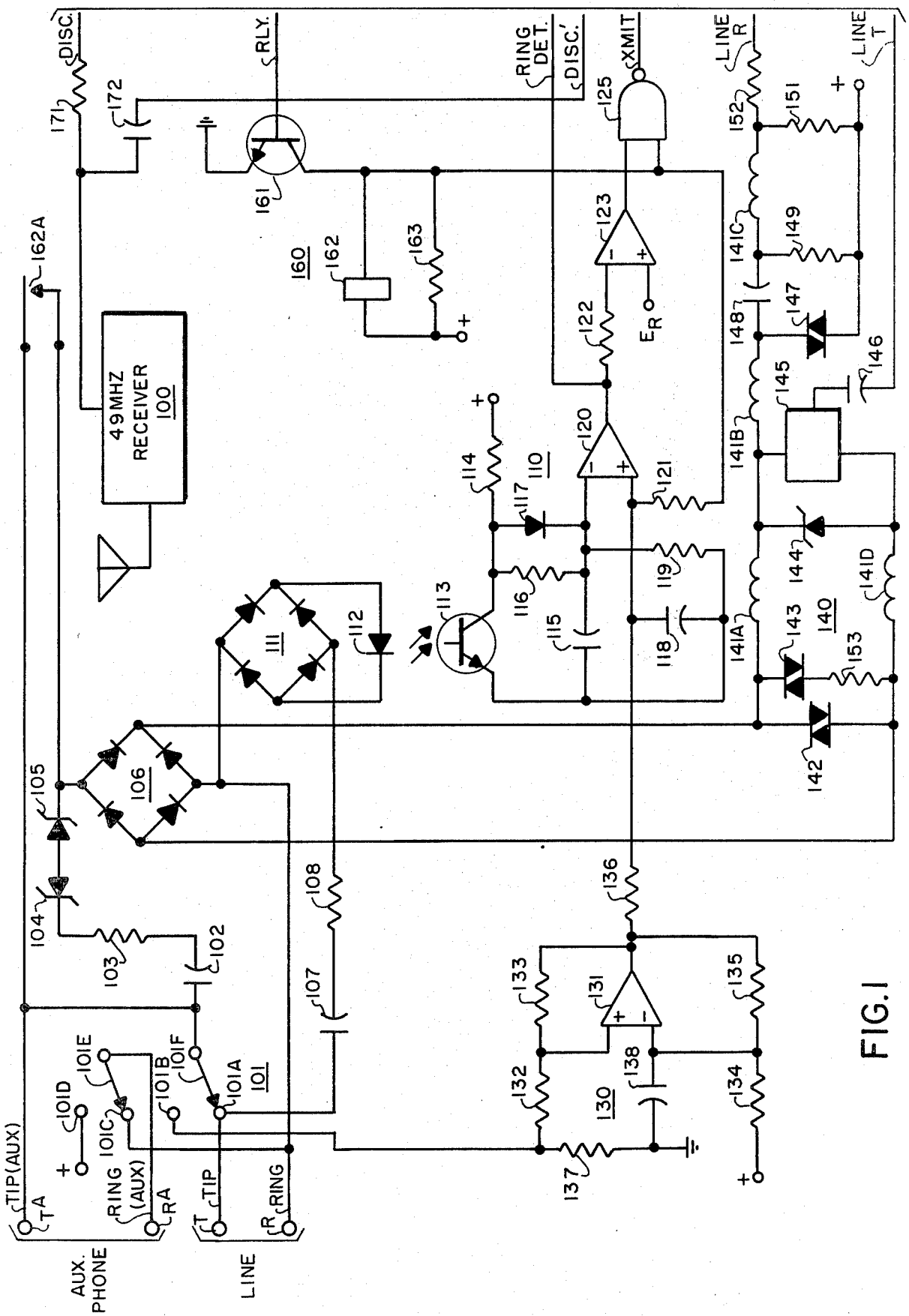
FIGS. 1 and 2 placed together with FIG. 1 to the left of FIG. 2 comprise a combination schematic and block diagram of a base unit for a wireless telephone extension unit in accordance with the present invention.

The circuitry of the base unit will be described initially. Referring first to FIG. 1, the Tip lead of the telephone line connected at terminal T is extended through intercom switch contact 101A and wiper 101F, (shown in the "normal" non-operated position), through open relay contacts 162A which are not operated at this time, through bridge circuit 106 and terminal R to the Ring conductor of the telephone line. A by-pass circuit extending from switch 101 directly to bridge circuit 106 including capacitor 102, resistor 103 and diodes 104 and 105 provides spark suppression for contacts 162A. Also connected to line terminal T through capacitor 107 and resistor 108 is bridge circuit 111 whose return is to terminal R of the line.

Bridge 111 forms a portion of ring detector circuit 110 which also includes light emitting diode (LED) 112 and photo transistor 113 (which combined comprise an optical coupler. Additionally, included in the ring detector are resistors 114, 116, 119 and 121, capacitors 115 and 118, diode 117 and operational amplifier 120. Associated with the ring detector circuitry is operational amplifier 123 (and associated resistor 122) which acts as a buffer to transmit operate gate 125.

As noted previously, the connection to the telephone line at terminals T and R, the Tip lead is extended through contact 101A on intercom switch 101. Terminals TA and RA are connected to the Tip (Aux) and Ring (Aux) leads with Ring (Aux) extending through contact 101C on intercom switch 101 and Tip (Aux) being connected to intercom switch wiper 101F and to one side of contacts 162A. When, intercom switch 101 is operated to the intercom position, the Tip (Aux) lead is extended through switch 101 to the intercom signalling circuit 130 which consists of operational amplifier 131 and resistors 132 through 137 and capacitor 138. The output of the intercom signalling circuit is extended through resistor 136 to the positive input of operational amplifier 120 included in the ring detector circuit 110.

Connected to bridge 106 is a self compensating voice network similar to that in the Solitare ® telephone manufactured by GTE Automatic Electric Incorporated. Included in this network are transformer 141 including windings 141A, 141B, 141C and 141D inclusive, varistors 142, 143 and 147 and zener diode 144, resistors 149, 151 and 152 and 153, capacitors 148 and 146 and microphone amplifier 145. Microphone amplifier 145 is of a special design simulating electrically a carbon microphone to the network while permitting the usage of an electret microphone. The circuitry of this amplifier is described in detail in the copending patent application Ser. No. 273,700 now U.S. Pat. No. 4,400,588 of Hines, Light and Stobbs filed on June 15, 1981. The self-compensating network 140 receives input signals from the 49 MHz receiver 100. This receiver in one practical embodiment of the present invention is a dual conversion super-heterodyne 49 MHz receiver of conventional design and construction.

Figure 2:
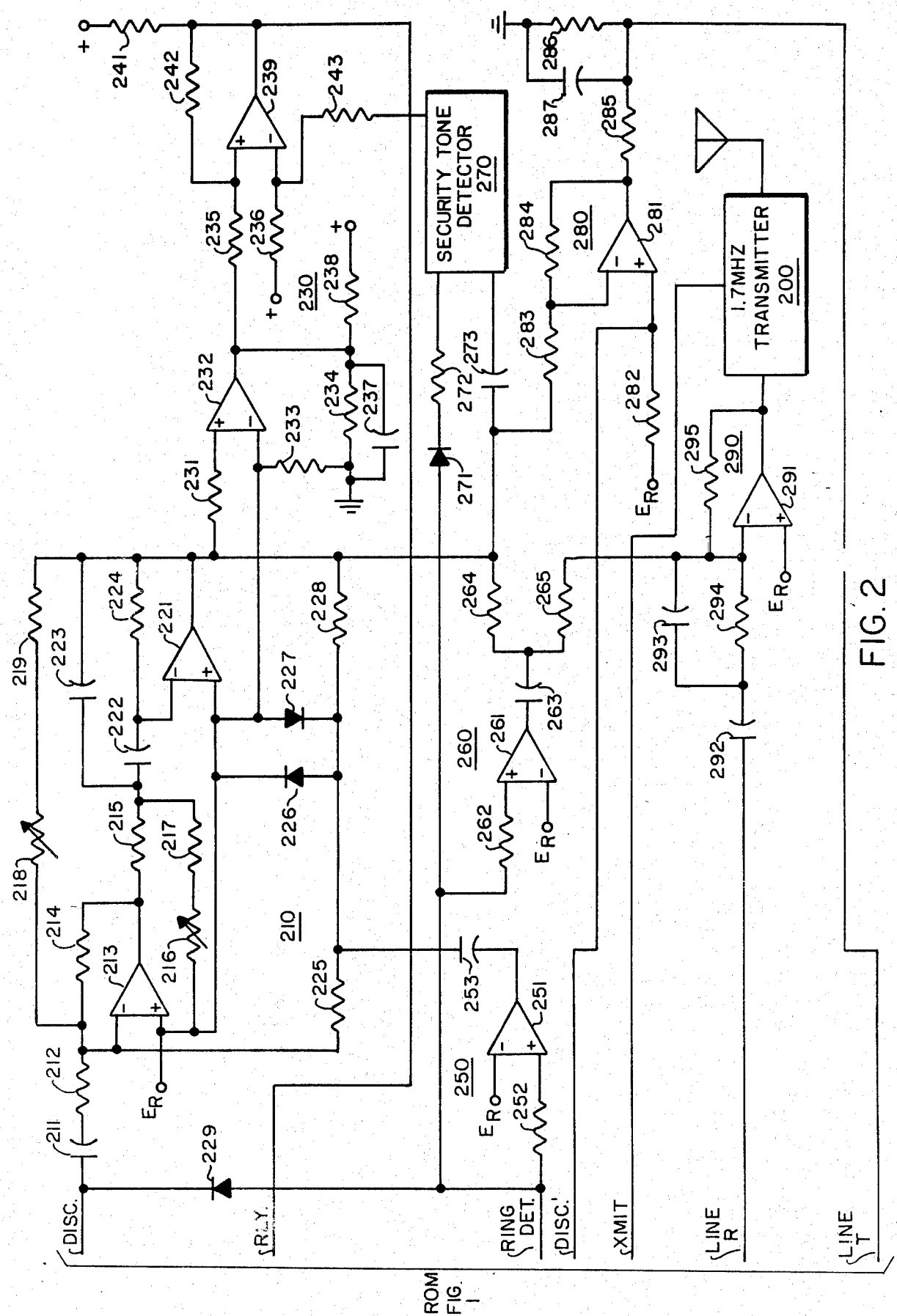

Output signals from the telephone are extended through the self-compensating network 140 to the 1.7 MHz transmitter 200 shown in FIG. 2. This transmitter is of conventional design. In a practical embodiment employing frequency modulation, signals from self-compensating network 140 are actually applied through modulator 290 which includes operational amplifier 291 capacitor 292, and resistors 294 and 295. Additional input to the modulator which shall be discussed later, is applied through capacitor 293. The output of operational amplifier 291 (i.e.: modulator 290) is applied to a varactor diode included in transmitter 200 to provide the necessary frequency modulation.

Before signals received by the 49 MHz receiver 100 can be extended to the telephone line via self-compensating network 140 the signals are initially extended through resistor 171 to filter/oscillator 210 shown in FIG. 2. Filter/oscillator 210 consists of operational amplifiers 213 and 221, resistors 212 through 219 and 224, 225 and 228 as well as capacitors 211, 222 and 223, and diodes 226 and 227. The first section of filter/oscillator 210 associated with operational amplifier 213 is a "Q-multiplier" with the second operational amplifier 221 acting as the filter proper. The overall gain and band width is set by resistors 218 and 219 and the frequency by resistors 216 and 217. Diodes 226, 227 and resistor 225 are inactive during the filter mode, because capacitor 253 provides an AC bypass to ground via the saturated output of a transistor included in operational amplifier 251. Operational amplifier 251, resistor 252 and 253 form a portion of the oscillator/filter control 250 which operates in response to ring detector 110. When operational amplifier 251 is switched "off" in response to the detection of an incoming ringing signal by a ring detector 110, capacitor 253 and the included AC path to ground is disconnected and feedback paths through resistors 225 and 228 and diodes 226 and 227 come into being and cause the circuitry of oscillator/filter 210 to go into oscillation. Resistor 228, and diodes 226 and 227, limit the amplitude of the oscillation and insure a constant output level over a range of supply voltage and oscillatory frequency. Diode 229 functions to blind the input to the oscillator/filter 210 during ringing.

Filter/Oscillator 210 is connected to several locations including the "on" hook/"off" hook control circuit 230. This circuit consists of operational amplifiers 232 and 239 as well as resistors 231, 233, 234, 235, 236, 238, 241, 242 and 243. Also included in the "on" hook/"off" hook control circuit 230 is capacitor 237. Operational amplifier 232 functions as a threshold detector to generate the necessary dial pulses only by detecting the presence of high level signals at a dial pulse rate from the output of oscillator/filter 210. The actual control function is performed by operational amplifier 239 which effectively causes the telephone to go "off" hook when dial tone is detected. Control of operational amplifier 239 is over resistor 243 from security tone detector 270.

Tone detector 270 is a conventionally designed tone decoder utilizing a phase locked loop integrated circuit as manufactured by National Semiconductor under their piece number LM567C or by other manufacturers. The security tone detector 270 detects a pre-determined particular frequency of tone generated by an associated remote unit. For example, this tone might be 5100 Hz for one combination of base and remote unit and 4800 Hz for another combination of base and remote unit. It should be obvious to those skilled in the art that numerous frequencies or combinations of frequencies may be utilized between base and remote units to provide the degree of security required in a particular system. The quantity of these frequencies is limited obviously only by the capability i.e.: band width, etc. of the phase lock loop circuitry, and the stability of same as included in the security tone detector.

An output is generated by operational amplifier 239 and extended to the base of transistor 161 turning it on, making a path available for power to relay 162. The operation of relay 162 at its associated contact 162A completes the path from the line to the transmission network 140 via bridge 106 and the circuitry of the self-compensating network 140 previously outlined. When the collector of transistor 161 is conductive, an operating signal is also extended to gate circuit 125 whose output is connected to the 1.7 MHz transmitter 200 turning it on.

Audio amplifier 280 consisting of operational amplifier 291 and resistors 282 through 286 inclusive and capacitor 287, receives voice signals from the 49 MHz receiver 100 and applies those signals through resistor 285 to the self-compensating network 140 through capacitor 146. Also applied through resistor 283 to operational amplifier 281 is the output from the security tone oscillator/filter 210 which is applied to the positive input of operational amplifier 281, with an equal output, equal amplitude and opposite phase to the negative input of operational amplifier 281, providing complete cancellation of the audio portion of the security tone signal, thus inhibiting security tone audio components from reaching the telephone line.

Gate control circuit 260 consisting of operational amplifier 261 resistors 262, 264, 265 and capacitor 263 operates to inhibit the security tone on the input of the 1.7 MHz transmitter 200 during normal talking mode. Security tone signals of maximum amplitude are extended through the modulator 290 to the transmitter 200 during the ringing mode.

The power supply for the wireless extension telephone base unit has not been shown since it is essentially of conventional design providing the necessary potentials where required. As a portion of this circuit, a reference voltage is applied throughout portions of the circuitry of the base unit, these locations being identified at terminals marked $E_R$. The power supply may also include the necessary facility for charging batteries included in the remote unit if desired.

The remote unit of the wireless extension telephone as shown in FIG. 3 includes a 1.7 MHz receiver 300 and a 49 MHz transmitter 390, operating to receive signals transmitted from the base unit and to transmit signals to the base unit on two separate frequencies thus providing full duplex operation. Both the transmitter and the receiver like those used in the base unit are of the frequency modulation type except the receiver is of the single conversion super-heterodyne unit and the transmitter is crystal controlled. Power for the remote unit is provided from a battery which may be of the rechargeable type and as noted above, if of the rechargeable type, may be recharged by connection to the power supply included in the base unit.

Included in the remote unit is dial circuit 350 which in a practical embodiment of the remote unit consists of a push button dial structure of conventional design connected to an integrated circuit dial pulse generator. The dial pulse generator is a commercially available unit avilable from a number of different manufacturers which in response to contact closures on the key pad produces appropriate trains of dial pulses for signalling purposes. One unit of this type is manufactured by Mostek Inc. and is commercially available under their piece part MK-5175.

Much of the circuitry contained in the wireless extension telephones remote unit is similar to that included in the base unit and described previously. For example, the security tone oscillator/filter 310 consisting of operational amplifiers 311, 321 and associated components 312 through 317 and 322 through 328 is virtually identical in construction and operation to the security oscillator 210 found in the base unit. Likewise, the control circuit utilized for changing the mode of operation of the oscillator/filter 310 from filter to oscillator is control circuit 360 consisting of operational amplifier 361 and associated resistor 362 and capacitor 363. Structurally and functionally, this circuit corresponds to control circuit 250 found in the base unit.

The modulator circuit 370 while not structurally identical to the modulator in the base unit is functionally similar. The modulator 370 consists of operational amplifier 373 driven by microphone 371 and additionally including capacitor 374 and resistors 372, 375, 376, 377, 378 and 379. The output of modulator 370 is applied to 49 MHz transmitter 390 where it is applied across a varactor diode which provides for the necessary frequency modulation of the 49 MHz transmitter.

Connected between dial circuit 350 and the modulator 370 is a transistor 351 which functions as a switch to provide a ground path through the transistor and capacitor 354 and resistor 355 to divert or reduce the amplitude of security tone signals fed to the 49 MHz transmitter and then sent to the base unit. However, during dialing the shunt that provides the modified or attenuated security tone is removed allowing the amplitude of the resultant pulses of security tone to be substantially greater than previously.

Connected to the outpt of the 1.7 MHz receiver 300, in addition to the oscillator/filter 310, is an ear piece amplifier 380 for amplifying incoming voice signals, consisting of operational amplifier 381 resistors 282, 384, 386 as well as capacitor 385 and 387 and diode 383. Connected to the output of the amplifier 380 is a telephone ear piece or receiver of conventional design 389. Also connected to ear piece 389 is the output of ringer oscillator 330. Ringer oscillator 330 consists of three sections, a comparator stage consisting of operational amplifier 331 and associated components 332 through 339, a switch stage consisting of operational amplifier 340 and components 341 through 344 and the final oscillator stage consisting of operational amplifier 345 and associated components 346 and 349. The output of oscillator stage is further amplified by transistor 393 which is utilized in the emitter follower configuration with the output connected to ear piece 389.

Of major importance also in the remote unit circuitry is hook switch 391 which upon operation provides ground during the "off" hook operation of the wireless unit to the 49 MHz transmitter 390 and to the dial circuit 350 for inhibiting ringing.

Further understanding of the present invention may be had by reference to FIGS. 1, 2 and 3 in connection with the following description of the placement of a telephone call by a subscriber at the wireless extension telephone remote unit. Initially, the subscriber goes to the operating or "off" hook mode by operating hook switch 391. Operation of hook switch 391 extends ground to the remote unit transmitter 390 turning it on. This also provides ground for operation of control circuit 360. The activation of control circuit 360 causes removal of the AC ground previously supplied through operational amplifier 361 and capacitor 363 to oscillator/filter circuit 310. Removal of this ground causes the filter circuit to go into the oscillation mode generating at the output thereof the appropriate security tone. In a practical embodiment of a wireless extension telephone according to the present invention, a frequency of 5100 Hz was utilized for this tone.

The output of the oscillator stage through resistors 379 and 377 is applied to modulator 370 where the output is taken through resistor 378 and extended to 49 MHz transmitter 390. Since transmitter 390 has already been turned on the security tone generated by oscillator 310 and applied through modulator 370 modulates the 49 MHz carrier frequency at that audio frequency causing the security signal to be radiated from the antenna associated with transmitter 390.

At the base unit, the 49 MHz signal from the remote unit is detected at 49 MHz receiver 100 and the output thereof routed through oscillator/filter 210 which in the present moment is functioning as a filter circuit. The tone passed through the filter 210 is then extended to security tone detector 270 where if the frequency is the appropriate one (as determined by the internal circuitry included in security tone detector 270), an output is generated and extended through resistor 243 to the negative input of operational amplifier 239 which is a part of the "on" hook/"off" hook control circuit 230 of the base unit. The output from "off" hook/"on" hook control circuit 230 is applied from operational amplifier 239 to the base of transistor 161, turning it on and providing a path to ground for relay 162 causing it to operate, closing at associated contacts 162A a path across the Tip and Ring leads extending to the telephone line, causing line seizure. Operation of transistor 161 also through gate 125 turns on transmitter 200.

With connection of the self-compensating network 140 through bridge circuit 106 to the telephone line, via terminals T and R and closed contact 162A, the proper conditions are now present for line seizure at the associated telephone central office to which the line is connected. At this point upon line seizure, dial tone will be returned over the line and extended back through the self-compensating network 140 and specifically through resistor 152 to modulator 290 where the dial tone signal is then applied to transmitter 200 which is modulated at the dial tone frequency and then transmitted at a frequency of 1.7 MHz via the associated antenna.

The radiated signal is received at the wireless extension unit remote unit by 1.7 MHz receiver 300, with the output therefrom applied through resistor 303 and conducted through amplifier 380 to the ear piece 389 where the dial tone is heard by the subscriber. The subscriber on hearing dial tone will now operate the key pad (not shown) associated with dial circuit 350 to generate the required dial pulses to signal a desired other party. Output pulses from dial circuit 350 are applied to the base of transistor 351 where for each transmitted pulse, ground is removed at the collector which thus removes resistor 355 from its previous function in the modulator 370 circuit. Thus during each dial pulse this results in a high amplitude signal being extended from the security tone oscillator through to the 49 MHz transmitter 390. This higher level dial pulse signal is then of course sent out from the transmitter, received at the base unit receiver 100 and extended through resistor 171 to the oscillator/filter circuit 210 which is still functioning in filter mode. These dial pulse signals from filter circuit 210 are then extended to the "on" hook/"off" hook control circuit 230 through resistor 231 which acts to turn off integrated circuit 239 at the dial pulse rate. This is accomplished by operational amplifier 232 and its associated components which function as a threshold detector, and in response to high level (amplitude) signal, turn integrated circuit 239 off for each received pulse signal. Thus transistor 161 at the base unit also turns off and on at the dial pulse rate causing associated relay 162 to operate off and on opening and closing associated contacts 162A thus opening and closing the line at the dial pulse rate causing the dial pulses to be extended to the telephone central office over the line.

After the dial pulses are extended to the telephone central office, the central office will provide the necessary switching connection in the usual manner and provide connection to the called subscriber. Upon completing, said connection ring back tone is sent back from the telephone central office over the telephone line to the wireless extension base unit where the tone is applied to the transmitter through the modulator in much the same manner as the previous dial tone was repeated. The ring back tone is then detected at the extension unit, by the receiver 300, amplified by ear piece amplifier 381, in turn reproduced by ear piece 389. The subscriber at the remote unit now waits until the party at the called station answers after which conversation may ensue, incoming voice signals from the telephone central office being extended to the remote station in the manner previously described. The subscriber at the remote unit speaks into the microphone 371 whose output is applied through modulator 370 in the normal manner to the telephone transmitter 390. At the base unit receiver 100 the voice signals are received and coupled from the output thereof through capacitor 172 to the telephone line amplifier 280 whose output is extended via the self-compensating network 140, terminals T and R and the telephone line to the telephone central office. In this manner, normal conversation from the wireless station and through the base station to a telephone central office takes place.

At the conclusion of the conversation, the subscriber at the remote station places his unit in the "on" hook or non-operated condition by restoring hookswitch 391, removing ground from the 49 MHz transmitter 390 and dialing circuit 350, causing termination of transmitted signals from the transmitter 390. At the base station, the lack of a signal being detected by the 49 MHz receiver 100 removes the security tone through resistor 171 from the input to oscilltor/filter 210 thus removing tone from security tone detector 270 causing operational amplifier 239 of "on" hook/"off" hook control circuit 230 to turn "off" which in turn, turns transistor 161 off, causing relay 162 to restore, opening at its associated contacts 162A, thus effectively disconnecting the station from the telephone line. If the subscriber at the distant end of the telephone call hangs up first, dial tone will be returned from the telephone central office and when this signal is heard by the subscriber at the remote extension unit, he then realizes that he too should go to the "on" hook or nonoperative mode after which the sequence described above will take place.

For an additional understanding of the present invention, the following description will be given and will describe the extension of a call initiated at a distant location through a telephone central office and over the telephone line to the wireless extension telephone of the present invention. Assuming that the telephone central office has extended the call over the telephone line via terminals T and R to the wireless extension telephone base unit, incoming ringing signals are extended via the previously described path to ring detector circuit 110 and specifically through bridge circuit 111 and the optical coupler consisting of LED 112 and photo transistor 113 where the output is extended to operational amplifier 120 and then to mode control circuit 250 causing oscillator/filter circuit 210 to go into the oscillatory mode. The output of ring detector circuitry 110 is also extended through operational amplifier 123 to transmit control gate 125 which functions to turn on the 1.7 MHz transmitter 200. The output from the oscillator/filter circuit 210 now operating in the oscillator mode is applied to modulator circuit 290 which modulates transmitter 200 at the security tone frequency generated by oscillator/filter 210. Transmitter 200 then transmits 1.7 MHz RF signals modulated at the security tone frequency.

The signal transmitted by the base unit is received at the extension unit 1.7 MHz receiver 300 and then conducted to oscillator/filter circuit 310 which is functioning in the filter mode at the remote unit. It should be noted at this time the remote unit is still in the "on" hook or not operated condition. Output from the filter section taken from operational amplifier 321 is applied to the ringer oscillator 330, through to its associated amplifier transistor 393 to the ear piece 389 where the operation of the ringer oscillator causes the ear piece to emit a distinctive tone to signal the presence of an incoming call to the subscriber at the remote extension unit. On hearing the alerting signal, the subscriber operates the hookswitch 391 placing ground on transmitter 390 causing it to operate. The 49 MHz transmitter 390 operates in the previously described manner extending a security tone signal to the base unit where its detected presence activates all of the circuitry at the base unit in the manner previously described. Conversation can now ensue. Disconnect after the call has been completed also takes place in the manner previously outlined.

A final mode of operation of the wireless extension telephone in accordance with the present invention, is that of the intercom mode. In this mode, it is necessary that an auxiliary telephone be connected at leads TA and RA of the base unit as shown in FIG. 1. Assuming that an incoming call has been answered by a subscriber at the auxiliary phone, and it is desired to extend that telephone call from the central office to the wireless extension remote unit, the subscriber at the auxiliary phone operates intercom switch 101, maintaining the switch in the operated mode until the subscriber at the remote unit responds. When the subscriber at the auxiliary phone operates intercom switch 101, battery is applied through the switch contact 101D, and over terminal RA, through the auxiliary phone and terminal TA through contacts 101B to the input of intercom signalling circuit 130 and specifically via resistor 132 to the positive input of operational amplifier 131. This battery application causes a periodic output from circuit 130 to be generated and extended through resistor 136 to ring detector circuit 110 where it is detected in much the same manner as the output from the optical coupler previously described. When this intercom signalling is detected, the sequence of operations follows the same path as previously described for an incoming call.

As the name implies the intercom switch 101 can also be operated to establish communication between the auxiliary phone connected to the base unit and the associated wireless remote extension unit. No central office call need be involved. In this mode of operation after the subscriber at the extension unit has answered, the party at the auxiliary phone restores intercom switch to its normal position and communication between the extension unit and the auxiliary phone can take place inasmuch as both phones are directly connected. It is also possible to establish a three way conversation between the auxiliary phone, the wireless extension unit, and a caller accessing the present invention over a line from the telephone central office.

While out a single embodiment of the present invention has been shown, it will be obvious to those skilled in the art that numerous modifications may be made to the disclosed embodiment without departing from the spirit and scope of the invention which shall be limited only by the claims appended thereto.

What is claimed is:

1. A wireless extension telephone system including an extension unit including a radio receiver, and a base unit comprising:
    a radio transmitter;
    a tuned circuit connected to said transmitter, operated in a first mode as a filter;
    mode control means connected to said tuned circuit;
    ringing signal detection means connected between an associated telephone line and said mode control means, operated in response to the detection of ringing signals received over said telephone line to operate said mode control means; and
    said tuned circuit further including a feedback path and said mode control means including a grounding circuit connected to said feedback path, said grounding circuit rendered inoperative in response to operation of said mode control means thereby rendering said tuned circuit operated in a second mode as an oscillator to generate signals for transmission by said radio transmitter, in response to said grounding circuit being rendered inoperative.

2. A wireless extension telephone system as claimed in claim 1 wherein: said base unit further includes modulation means connected between said tuned circuit and said radio transmitter, operated in response to signals generated by said tuned circuit in said oscillator mode to modulate said radio transmitter at the frequency of said signals.

3. A wireless extension telephone system as claimed in claim 1 wherein: said extension unit further includes transducer means including circuit connections to said radio receiver, operated to reproduce signals received by said receiver in response to transmission of radio signals by said radio transmitter included in said base unit.

4. A wireless extension telephone system as claimed in claim 3 wherein: said extension unit further includes filter means connected between said radio receiver and said transducer operated to selectively couple signals of a predetermined frequency received by said receiver, to said transducer.

5. A wireless extension telephone system as claimed in claim 4 wherein: said extension unit further includes amplifier means connected between said radio receiver and said transducer operated in response to signals received by said receiver to amplify said signals for reproduction by said transducer.

6. A wireless extension telephone system as claimed in claim 4 wherein: said extension unit further includes a ringing signal oscillator connected between said filter means and said transducer operated in response to signals of a predetermined frequency coupled through said filter means to generate ringing signals for application to said transducer.

* * * * *